US012000543B2

United States Patent
Al-Hannabi et al.

(10) Patent No.: US 12,000,543 B2
(45) Date of Patent: Jun. 4, 2024

(54) MIXER WITH MULTI-INJECTION QUILLS

(71) Applicant: SAUDI ARABIAN OIL COMPANY, Dhahran (SA)

(72) Inventors: Abdoulelah Naji Al-Hannabi, Mubarraz (SA); Mohammed Dhaifallah Alotaibi, Khobar (SA); Hatam Mehraz, Najmah (SA); Saad Hezam Alshahrani, Khamis Mushayt (SA); Fikir Ali Al-Suwaileh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 65 days.

(21) Appl. No.: 18/046,299

(22) Filed: Oct. 13, 2022

(65) Prior Publication Data
US 2024/0125437 A1    Apr. 18, 2024

(51) Int. Cl.
*G05D 21/02*    (2006.01)
*F17D 3/12*    (2006.01)

(52) U.S. Cl.
CPC ............... *F17D 3/12* (2013.01); *G05D 21/02* (2013.01)

(58) Field of Classification Search
CPC ................................. F17D 3/12; G05D 21/02
See application file for complete search history.

(56) References Cited

U.S. PATENT DOCUMENTS

| | | | | |
|---|---|---|---|---|
| 3,089,422 A | * | 5/1963 | Graham | ............... F02M 41/08 417/213 |
| 5,645,874 A | * | 7/1997 | Osuna-Diaz | ............ B29C 45/27 425/572 |
| 6,165,372 A | * | 12/2000 | Ziemer | ............... B01F 25/313 210/749 |
| 8,992,851 B2 | | 3/2015 | Herbert | |
| 10,822,694 B2 | * | 11/2020 | Chung | ............... C23C 16/4405 |

(Continued)

FOREIGN PATENT DOCUMENTS

| AU | 2013404004 B2 | 5/2018 |
|---|---|---|
| WO | 2013070728 A1 | 5/2013 |

OTHER PUBLICATIONS

"Model 2800 Wafer Style Static Mixer", Product Brochure, Westfall Manufacturing Company, Access Date: Oct. 12, 2022, URL: <http://westfallstaticmixers.com/wp-content/uploads/2017/01/2800-Mixer-Brochure-2.pdf> (4 pages).

*Primary Examiner* — Kevin R Barss
(74) *Attorney, Agent, or Firm* — Osha Bergman Watanabe & Burton LLP

(57) ABSTRACT

A combined chemical injection and mixing system including an injection stream pipe, a target pipe disposed within the injection stream pipe, and a plurality of injection quills is described. The injection stream pipe encloses the plurality of injection quills, and the plurality of injection quills each independently includes a quill check valve and a quill flange. A method for mixing at least one chemical in a pipeline is also described. The method includes providing a chemical injection and mixing system configured to a pipeline, forming a pipeline treatment system, providing a fluid flow in the pipeline treatment system, injecting at least one chemical via the plurality of injection quills, and mixing the at least one injected chemical in a mixing zone of the chemical injection and mixing system, thereby mixing the at least one injected chemical in the fluid flow.

20 Claims, 5 Drawing Sheets

(56) References Cited

U.S. PATENT DOCUMENTS

| | | | |
|---|---|---|---|
| 11,140,963 B2* | 10/2021 | Jeon | A46B 11/0089 |
| 2006/0065066 A1* | 3/2006 | Bellis, Jr. | G01D 11/30 |
| | | | 73/866.5 |
| 2006/0225402 A1* | 10/2006 | Kierspe | F02C 3/30 |
| | | | 60/39.5 |
| 2007/0051640 A1* | 3/2007 | Bellamy | B01D 61/425 |
| | | | 205/742 |
| 2014/0128297 A1* | 5/2014 | Conrad | C09K 8/605 |
| | | | 210/198.1 |
| 2014/0138325 A1* | 5/2014 | Tomsheck | C01B 11/024 |
| | | | 210/756 |
| 2016/0208176 A1* | 7/2016 | Barroeta | C10G 31/08 |
| 2016/0263537 A1* | 9/2016 | Kenreck, Jr. | B01F 25/3133 |
| 2017/0261420 A1* | 9/2017 | Bellis, Sr. | G01N 17/04 |
| 2017/0314686 A1* | 11/2017 | Wild | F16K 5/0642 |
| 2018/0031397 A1* | 2/2018 | Al Faihan | G01D 11/245 |
| 2019/0113420 A1* | 4/2019 | Johnson | G01F 1/684 |
| 2019/0186239 A1* | 6/2019 | Rutherford | E21B 43/013 |
| 2019/0275479 A1* | 9/2019 | Jagers | B01F 25/4335 |
| 2020/0300414 A1* | 9/2020 | Nowak | F17D 3/12 |
| 2021/0069534 A1* | 3/2021 | Shin | A62C 37/48 |

* cited by examiner

MIXER WITH MULTI-INJECTION QUILLS

BACKGROUND

In the oil and gas industry, pipeline integrity and flow assurance are critical components of a successful and operational continuous flow system. In many instances, pipeline systems require the introduction of chemical treatments for which corrosive chemicals are injected into a pipeline. These chemical treatments may be introduced to control corrosion, prevent plugging, eliminate hydrogen sulfide, or provide other chemical treatments that ensure the quality of the treated fluid and production continuity of the treated fluid.

As shown in FIG. 1A, a horizontal cross-sectional view of an example of a conventional single quill injection system 100 includes a piping segment 108 and a static mixer 114. The piping segment 108 of the conventional single quill injection system 100 includes a single injection quill 104, a mixing area 106, a fluid flow 102. The static mixer may be attached to the piping segment 108 via piping flange 110, stud 112, and flange seal 116. The piping segment 108 of the conventional single quill injection system 100 may be in fluid communication with a pipeline segment 118. FIG. 1B is a vertical cross-sectional view of an example of a conventional single quill injection system 100. As shown, the single injection quill 104 is fixed in one position of piping segment 108 upstream of a mixing area 106. As described above, the static mixer 114 is configured downstream of the injection quill 104.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a combined chemical injection and mixing system including an injection stream pipe, a target pipe disposed within the injection stream pipe, and a plurality of injection quills. The injection stream pipe encloses the plurality of injection quills, and the plurality of injection quills each independently includes a quill check valve and a quill flange.

In another aspect, embodiments disclosed herein relate to a method for mixing at least one chemical in a pipeline. The method including providing a chemical injection and mixing system configured to a pipeline, forming a pipeline treatment system, providing a fluid flow in the pipeline treatment system, injecting at least one chemical via the plurality of injection quills, and mixing the at least one injected chemical in a mixing zone of the chemical injection and mixing system, thereby mixing the at least one injected chemical in the fluid flow.

Other aspects and advantages of the claimed subject matter will be apparent from the following description and the appended claims.

BRIEF DESCRIPTION OF DRAWINGS

PRIOR ART

PRIOR ART

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Methods of introducing a chemical into a continuous flow using a conventional single-quill system often result in deterioration of the injection quill, which subsequently impacts injection efficiency of the treatment system and the pipeline integrity. Deterioration of the injection quill typically occurs during shutdown or upset conditions, in which a corrosive chemical will continue feeding into the pipeline through the injection quill without bulk fluid flow in the pipeline. Additionally, complete degradation of the quill may also occur as a single injection quill drives high concentrations of a chemicals into the feed. Further, the conventional single-injection quill system requires a static mixer to be installed downstream of the injection quill to ensure the chemical is unified with the flow of the pipeline.

Embodiments disclosed herein relate to a system capable of introducing, distributing, diluting, and controlling the concentration of one or more chemical treatments to a carried fluid of a pipeline such that the chemical treatments are mixed with the carried fluid. The system is capable of providing at least one chemical to a fluid of a pipeline such that the injected chemical is sufficiently distributed and mixed in a fluid flow of the pipeline to provide a uniform treatment of the fluid flow of a pipeline. The system is capable of distributing chemical treatments via multiple injection elements. The system is capable of mixing at least one chemical with a fluid flow without the use of a separate static mixing element.

In one aspect, embodiments disclosed herein relate to a chemical injection and mixing system that includes an injection stream pipe, a target pipe disposed within the injection stream pipe, and multiple injection elements, such as a plurality of injection quills (or "injection quills"). In one or more embodiments, the chemical injection and mixing system is installed on a pipeline. In one or more embodiments, the system is installed on the pipeline at a location about 1 meter (m) away from an area with a directional change in the flow, such as a pipeline elbow.

Figure 1A:
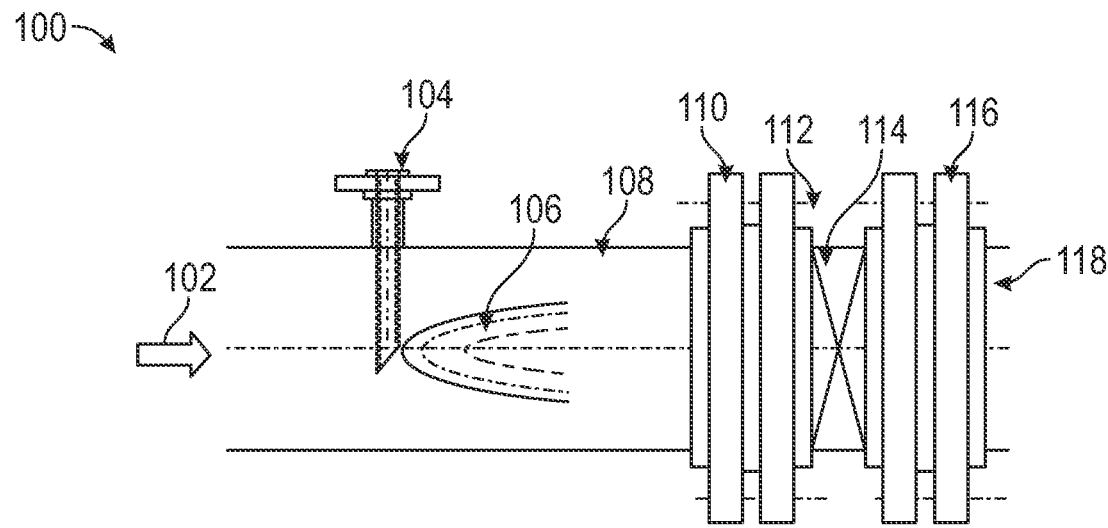
FIG. 1A is a cross-sectional diagram of a conventional single-quill injection system.
Figure 1B:
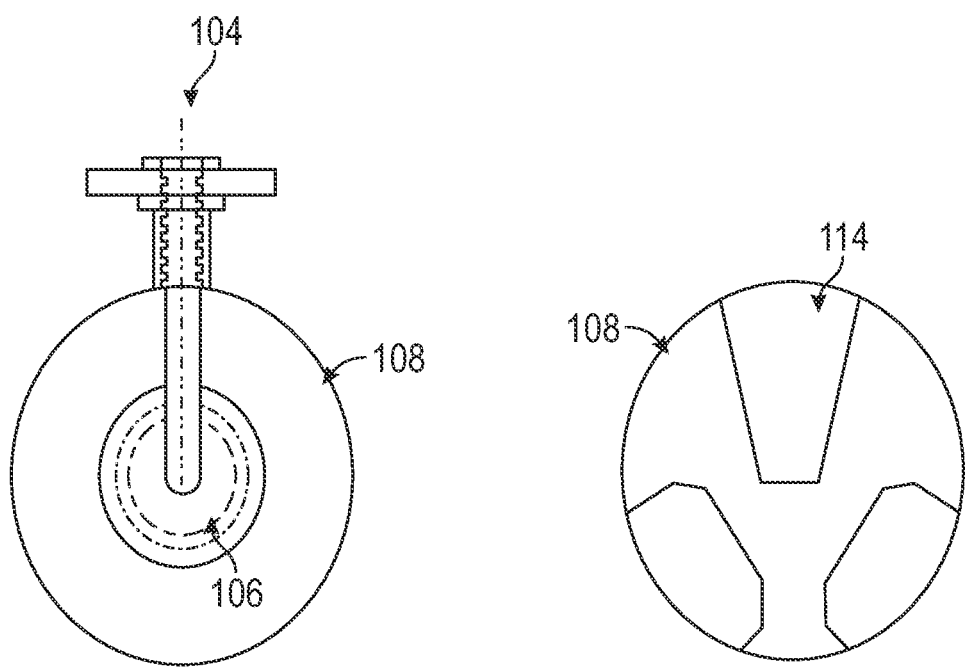
FIG. 1B is a cross-sectional diagram of a conventional single-quill injection system.
Figure 2A:
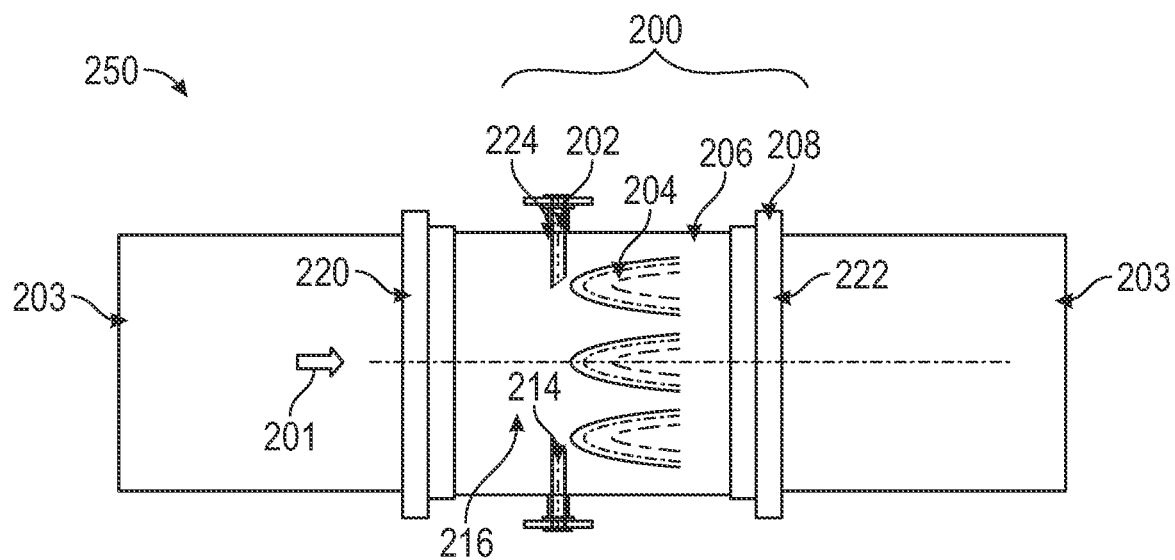
FIG. 2A is a horizontal cross-sectional diagram of a chemical injection and mixing system installed along a pipeline to form a pipeline treatment system according to one or more embodiments.

FIG. 2A is a schematic of a cross-sectional side view of a chemical injection and mixing system 200 installed along a pipeline 203 to form a pipeline treatment system 250 according to one or more embodiments. The pipeline 203 may carry a fluid such that the fluid has continuous flow through the pipeline 203 and the pipeline treatment system 250. The carried fluid may be an aqueous fluid, a hydrocarbon-based fluid, such as crude oil, a gas, or combinations thereof. The system 200 may be made of any suitable material, such as steel, that is able to withstand chemical injection conditions, fluid flow conditions, such as the pressures and temperatures of the carried fluid, or both.

A chemical injection and mixing system 200 of one or more embodiments further includes a flange connection 208. In one or more embodiments, the chemical injection and mixing system 200 may be installed along a pipeline 203 using flange connections 208. In one or more embodiments, the pipeline may have a fluid flow direction as indicated by arrow 201 of FIG. 2A. The system 200 has an inlet side 220 and an outlet side 222.

The pipeline 203 may be made of a pipeline material selected from the group consisting of steel, carbon steel of different variations, titanium based materials, metal alloys, non-metallic materials, and combinations thereof. In one or more embodiments, the pipeline material is able to withstand conditions of a fluid flow, such as the pressures and temperatures of a carried fluid. In one or more embodiments, the chemical injection and mixing system 200 is installed along the pipeline 203 by welding the system 200 to pipeline 203, installing the system 200 via a thread connection the system 200 to pipeline 203, or both. In some embodiments, the system 200 is welded to an uncoated pipe of a pipeline 203. In some embodiments, the system 200 is connected to a coated pipe of a pipeline 203 via a thread connection.

The system 200 may be a mixer with multiple injection quills, such as the injection quills 202. The injection quills may each independently include a valve, a nozzle, a quill flange, or combinations thereof. In one or more embodiments, the nozzles 214 of the injection quills 202 are configured in an internal passage 216 of the target pipe 206.

The system 200 may include a target pipe 206 disposed within the injection stream pipe that frames an internal passage 216. The injection quills 202 may be configured proximate to the inlet side 220. The injection quills 202 may be configured at a distance between the inlet side 220 and the outlet side 222. In one or more embodiments, the injection quills 202 are installed at an installation point 224 having a distance upstream of the mixing zone 204. The injection quill installation distance may be a midpoint distance between the inlet side 220 and the outlet side 222 of the system.

Figure 2B:
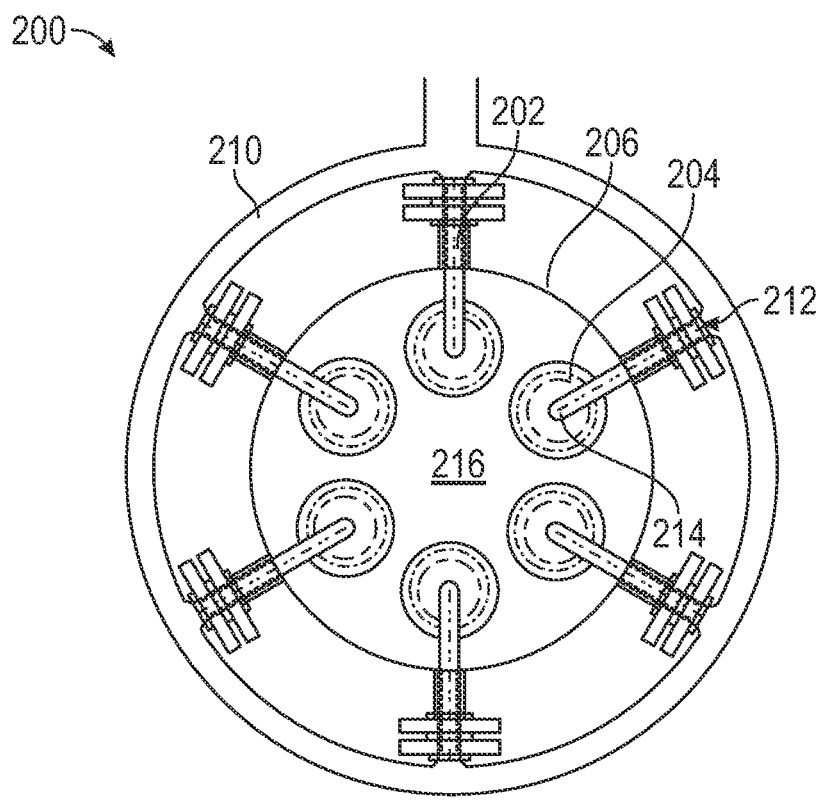
FIG. 2B is a vertical cross-sectional diagram of a chemical injection and mixing system according to one or more embodiments.

FIG. 2B is a schematic of a cross-sectional view of the chemical injection and mixing system 200 according to one or more embodiments. In one or more embodiments, the injection stream pipe 210 encloses the injection quills 202. The injection quills 202 may be installed in the injection stream pipe via connection with a quill flange 212. The quill flange 212 may connect a fluid line of one or more chemical sources (not shown) to the injection quills 202 such that the one or more chemical sources are in fluid connection with the injection quills 202.

In one or more embodiments, the injection quills 202 includes two or more injection quills. The injection quills may include three or more injection quills. The injection quills may include four or more injection quills. The injection quills may include five or more injection quills. The injection quills may include six or more injection quills. The plurality of injection quills may include two or more injection quills. The injection quills may be radially configured with respect to a vertical axis of the injection stream pipe 210. The injection quills 202 may be independently configured in the injection stream pipe 210 at an equal distance from each other. For example, in one or more particular embodiments, the plurality of injection quills 202 includes six injection quills as shown in FIG. 2B. In such embodiments, the six injection quills may be configured at 0°, 60°, 90°, 120°, 180°, 240°, and 300° with respect to a vertical axis of the injection stream pipe. In some embodiments, there may be two injection quills which may be configured at 0° and 180° with respect to a vertical axis of the injection stream pipe. In some embodiments, there may be three injection quills, which may be configured at 0°, 120°, and 240° with respect to a vertical axis of the injection stream pipe. In some embodiments, there may be four injection quills, which may be configured at 0°, 90°, 180°, and 270° with respect to a vertical axis of the injection stream pipe. In some embodiments, there may be five injection quills, which may be configured at 0°, 72°, 144°, 216°, and 288° with respect to a vertical axis of the injection stream pipe.

In one or more embodiments, the injection quills 202 each independently include a nozzle 214. The injection quills 202 are installed in the system 200 such that the nozzles 214 extend into internal passage 216. In one or more embodiments, the plurality of injection quills 202 is configured such that the nozzles 214 are disposed perpendicular to the direction of fluid flow (arrow 201) of the pipeline 203. The nozzles 214 of the injection quills 202 may extend into the internal passage 216 such that the nozzles are in fluid communication with a fluid flow of the pipeline.

In one or more embodiments, a valve is included in each injection quill of the injection quills. The valve may be a valve that controls a flow of at least one chemical from one or more chemical sources such that the valve prevents backflow. The valve of the injection quill may be a quill check valve. The quill check valves prevent a backflow of the at least one chemical in the injection quills. The quill check valves may prevent backflow of the one or more injected chemicals in the event that one or more of the injection quills has corroded.

In one or more embodiments, the injection quills are in fluid communication with one or more chemical sources via a fluid connection. The one or more chemical sources may include chemical storage tanks and/or pumps to deliver the at least one chemical, such as a corrosion inhibitor, drag reducing agents, among others, to the injection quills via the fluid connection. In one or more embodiments the at least one chemical may be selected from the group consisting of sulfuric acid, chlorine, methanol, and combinations thereof.

Figure 3:
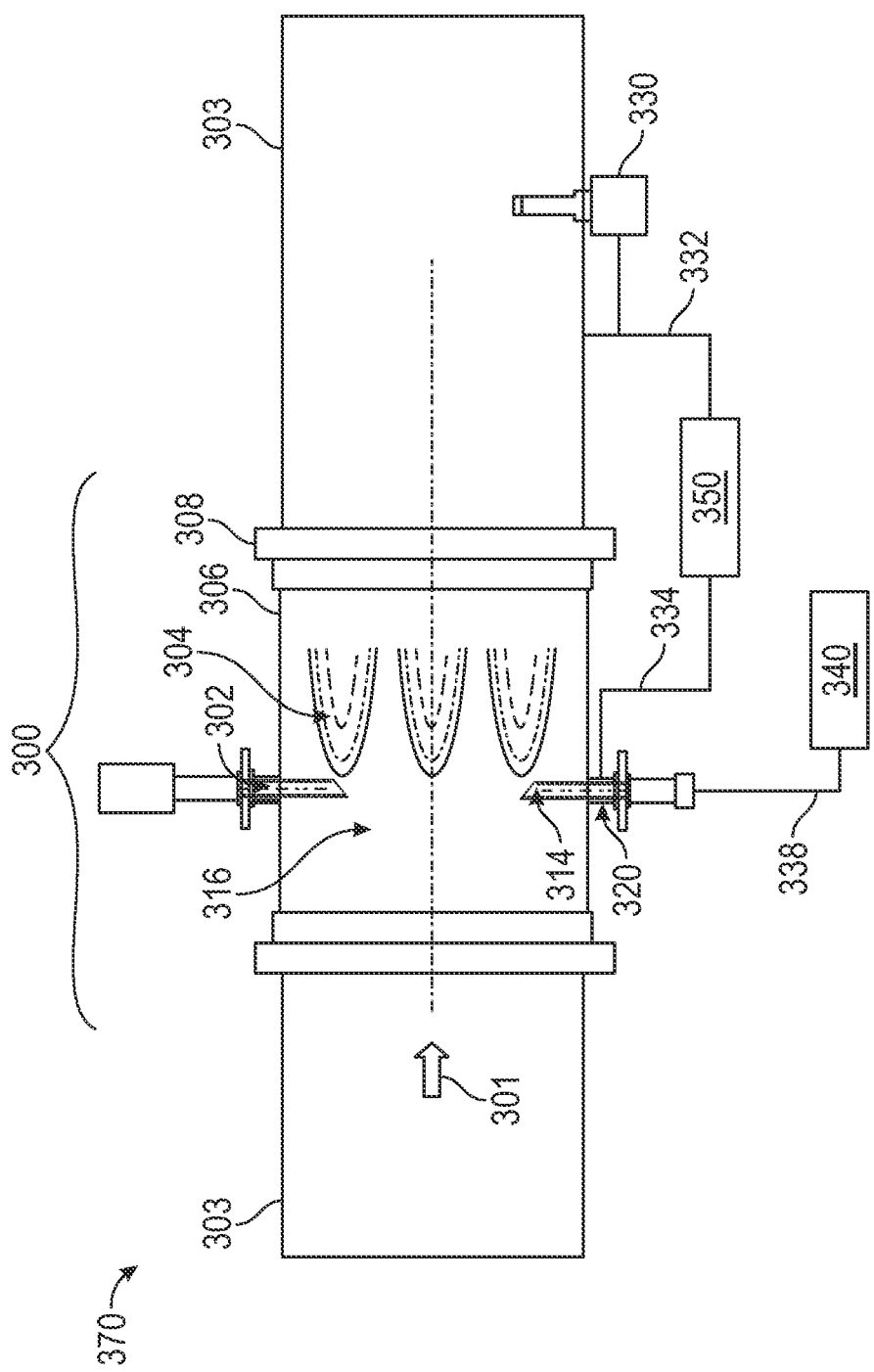
FIG. 3 is a schematic of a pipeline treatment system including a chemical injection and mixing system in electrical connection to a control unit according to one or more embodiments.

FIG. 3 is a schematic of a pipeline treatment system 370 including a chemical injection and mixing system 300 in electrical connection to a control unit 350 according to one or more embodiments. As described above, the chemical injection and mixing system 300 may be installed along a pipeline 303. The chemical injection and mixing system 300 may be as described above and include components, such as a plurality of injection quills 302 that independently include a quill flange (not shown) and a nozzle 314, a mixing zone 304, a target pipe 306, a piping flange 308, and a target passage 316.

In one or more embodiments, the injection quills, the one or more chemical sources, the system, or combinations thereof may be in electrical communication with a control unit 350. The control unit 350 may be included in the chemical injection and mixing system. The control unit 350 may be in electrical communication with the injection quills 302 via an electrical connection 334. The control unit 350 may be installed at a location proximate to the chemical injection and mixing system. In one or more embodiments, the control unit 350 controls a flow rate for the injection of at least one chemical via the injection quills.

In one or more embodiments, the control unit 350 includes a flow control system to control the injection of at least one chemical to a fluid flow of a pipeline from at least one chemical source 340 via fluid connection 338 and the injection quills 302. The flow control system may be automated or be under manual control. For example, a flow control system may include hardware, software, or both, with functionality for regulating and controlling the flow of at least one chemical, until a threshold concentration of at least one chemical mixed with the fluid flow is achieved. In one or more embodiments, the hardware and/or software is configured to automatically control a flow rate of the injection quills such that the concentration of at least one chemical is controlled.

In one or more embodiments, the control unit 350 may regulate, initiate, or terminate the injection of at least one chemical via controlling a flow rate of the injection quills. The control unit 350 may be connected to a sensor 330 via electrical connection 332. The sensor may be a pH sensor. The sensor may be installed on pipeline 303 such that a concentration of at least one chemical mixed with pipeline fluid flow is measured downstream of the system 300.

In one or more embodiments, the control unit 350 increases, decreases, or maintains a flow rate of each injection quill based on the concentration of at least one chemical mixed with the pipeline fluid flow. A non-limiting example of control unit 350 operation includes the sensor 330 measuring a pH of the one or more injected chemicals mixed with the pipeline fluid flow 301. The measured pH may be transmitted in a first signal to the control unit 350 via electrical connection 332 such that the control unit 350 may extrapolate the concentration of at least one chemical mixed with the fluid flow downstream of the system 300 based on a known, or pre-established pH vs. concentration curve.

In one or more embodiments, the control unit 350 monitors the pH of the one or more injected chemicals mixed with the pipeline fluid flow such that the control unit transmits one or more signals to the plurality of injection quills. The control unit 350 may control the injection of one or more chemicals such that (1) a pH of the one or more injected chemicals mixed with the pipeline fluid flow 301, (2) an extrapolated concentration of the one or more injected chemicals mixed with the pipeline fluid flow 301, or both, are regulated. Control unit 350 may transmit a second signal via electrical connection 334 to a flow control 320 of an injection quill 302 to control a flow rate of one or more injections quills.

Figure 4:
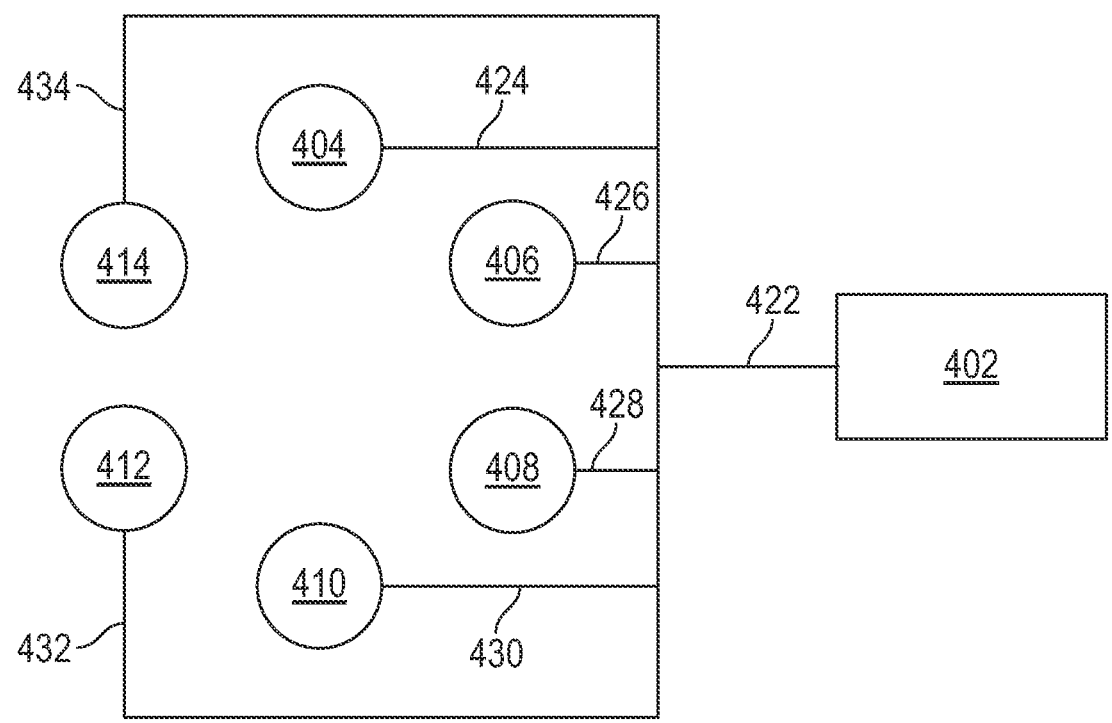
FIG. 4 is a schematic representing a control unit in electrical connection to flow controls of six of injection quills of a chemical injection and mixing system according to one or more embodiments

FIG. 4 is a schematic representing a control unit in electrical connection to flow controls of six of injection quills of a chemical injection and mixing system according to one or more embodiments. As shown in FIG. 4, a control unit 402 is in electrical communication via electronic connection 422 with a first injection quill flow control 404 via electrical connection 424, a second injection quill flow control 406 via electrical connection 426, a third injection quill flow control 408 via electrical connection 428, a fourth injection quill flow control 410 via electrical connection 430, a fifth injection quill flow control 412 via electrical connection 432, and a sixth injection quill flow control 414 via electrical connection 434.

Figure 5:
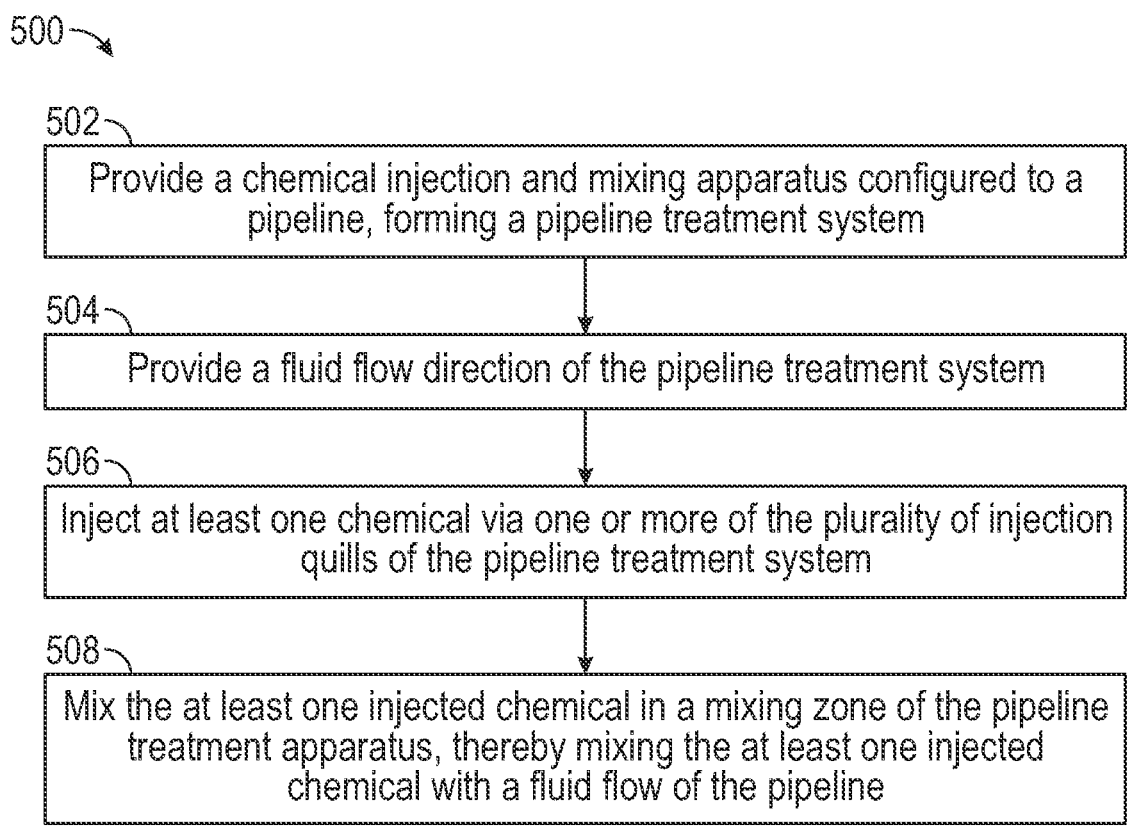
FIG. 5 is a method of treating a fluid flow of a pipeline including a chemical injection and mixing system according to one or more embodiments.

FIG. 5 depicts a flowchart in accordance with one or more embodiments. More specifically, FIG. 5 illustrates a method for mixing at least one chemical in a pipeline with the chemical injection and mixing system. Further, one or more blocks in FIG. 5 may be performed by one or more components as described in FIGS. 2A and 2B, FIG. 3, and/or FIG. 4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In one or more embodiments, the method 500 includes block 502 that includes providing a chemical injection and mixing system configured to a pipeline. The system may be installed on a pipeline as described above. Block 504 includes providing a fluid flow direction of the pipeline treatment system. The fluid flow may include transporting fluids such as aqueous fluids, hydrocarbon-based fluids, gases, or combinations thereof.

In block 506, at least one chemical may be injected via the plurality of injection quills of the pipeline treatment system. The injection of at least one chemical may include providing one or more chemical sources in fluid communication with the injection quills via a fluid connection. In such embodiments, the at least one chemical may be transported from the one or more chemical sources to the injection quills via the fluid connection.

In one or more embodiments, the injection of at least one chemical may further include operating a control unit. Operating the control unit may include controlling the injection of at least one chemical with the control unit. The controlling the injection of at least one chemical may include initiating a chemical injection of at least one chemical via one or more of the injection quills, regulating a chemical injection of at least one chemical via one or more of the injection quills, and/or of at least one chemical via one or more of the injection quills.

The at least one chemical may be injected through the injection quills as described above and such that the nozzles of the injection quills provide the at least one injected chemical to a fluid flow of the pipeline. In one or more embodiments, the nozzles of the injection quills may be in fluid communication with the fluid flow of the pipeline such that at least one injected chemical may contact the fluid flow of the pipeline upon injection.

The control unit may regulate the flow rate of one or more of the plurality of injection quills to inject at least one chemical as described above. The flow rate of each injection quill may be the same or different. The flow rate of the plurality of injection quills may be the same to treat a single-phase flow. The term "single-phase flow" refers to a flow consisting essentially of a single phase, such as an oil-based fluid, an aqueous-based fluid, or a gas.

A pipeline of one or more embodiments may carry a multiphase flow. The term "multiphase flow" refers to two or more phases carried in a pipeline. The two or more phases may include an oil-based fluid and a gas, an aqueous-based fluid and an immiscible oil-based fluid, or an aqueous-based fluid and a gas. A three-phase fluid may include oil-based fluid, an aqueous-based fluid, and a gas.

The control unit may regulate injection quills to have different chemical flow rates in which a multiphase flow is carried by the pipeline. For example, if a pipeline carries two-phase fluid flow, injection quills configured between about 0° and about 90° and about 270° and about 360° with respect to a vertical axis of the injection stream pipe may be controlled to disperse at least one chemical at 60% of a rate of the injection quills configured between about 90° and about 270° with respect to a vertical axis of the injection pipe. In such embodiments, the quills configured between about 90° and about 270° with respect to a vertical axis of the injection pipe may provide at least one chemical to treat the denser fluid, such as an aqueous-based or oil-based fluid. The quills configured between about 0° and about 90° and about 270° and about 360° with respect to a vertical axis of the injection stream pipe may treat the less dense phase, such as a gas, of the fluid flow.

In one or more embodiments, injection of at least one chemical may include detecting corrosion in the pipeline. The corrosion of the pipeline may include a localized corrosion area proximate to one or more injection quills. Detecting corrosion of the pipeline may include observing a corroded area proximate to one or more injection quills, observing a deteriorated area proximate to one or more injection quills, or both.

The method of one or more embodiments may include detecting corrosion of one or more injection quills. Injection quill corrosion may be detected via monitoring an injected chemical concentration downstream of the mixing zone in the fluid flow of the pipeline. In such embodiments, the injected chemical concentration may be lower than a designated concentration required to treat the pipeline fluid flow.

Embodiments in which corrosion is detected in the pipeline, in the one or more injection quills, or both, may include replacing the one or more injection quills. Replacing the injection quills includes removing the injection quill from the chemical injection and mixing apparatus via detaching the quill from the flange connection. As one of ordinary skill may appreciate, the injection quill, flange connection, or both may be replaced such that a new or uncorroded injection quill is installed.

Block 508 includes mixing the at least one injected chemical in a mixing zone of the pipeline treatment system. As mentioned above, the at least one injected chemical may be injected via one or more of the radially distributed injection quills. The mixing of the at least one injected chemical via the radially distributed injection quills may further include injecting the at least one chemical at one or more locations of the fluid flow. In such embodiments, the injection of the at least one or more locations of the fluid flow provides uniform distribution of the injected chemical in the fluid flow. In one or more embodiments, providing the uniform distribution of the injected chemical such that the uniform distribution of the chemical provides a uniform concentration in the fluid flow, thereby mixing the at least one injected chemical with a fluid flow of the pipeline.

In one or more embodiments, the chemical injection and mixing system may be applied to systems that support chemical injections in tanks, vessels, and other applicable systems in the oil and gas industry, which includes refineries and the petrochemical industry, the water treatment industry, and/or the food industry.

Embodiments of the present disclosure may provide at least one of the following advantages. The chemical injection and mixing system may be employed for the injection of at least one chemical into pipelines. The system of one or more embodiments may sufficiently dilute at least one chemical in a fluid flow of the pipeline such that the at least one chemical is uniformly mixed with the fluid flow via radial distribution of one or more injection quills of the system. As such, the installation of a chemical injection and mixing system on a pipeline or a continuous flow system may provide a targeted treatment of a fluid flow and eliminate the need for a static mixer to be installed on a pipeline or continuous fluid flow system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range. While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A combined chemical injection and mixing system comprising:
   an injection stream pipe;
   a target pipe disposed within the injection stream pipe; and
   a plurality of injection quills,
   wherein the injection stream pipe encloses the plurality of injection quills, and
   wherein the plurality of injection quills each independently comprise a quill check valve and a quill flange.

2. The system of claim 1, wherein the system further comprises a piping flange.

3. The system of claim 2, wherein the system is connected to a target pipe via the piping flange.

4. The system of claim 1, wherein the system further comprises a mixing zone.

5. The system of claim 1, wherein the plurality of injection quills comprises two or more injection quills.

6. The system of claim 5, wherein the two or more injection quills are radially configured with respect to a vertical axis of the injection stream pipe.

7. The system of claim 1, wherein the plurality of injection quills comprises six injection quills.

8. The system of claim 7, wherein the six injection quills are radially disposed at 0°, 60°, 90°, 120°, 180°, 240°, and 300° with respect to a vertical axis of the injection stream pipe.

9. The system of claim 1, wherein the system comprises a control unit in electrical connection with the plurality of injection quills.

10. The system of claim 9, wherein the control unit is electrically connected to a sensor, wherein the sensor is located downstream of the chemical injection and mixing system on a pipeline.

11. The system of claim 9, wherein the plurality of injection quills are in fluid communication with one or more chemical sources comprising at least one.

12. The system of claim 11, wherein the at least one chemical is selected from the group consisting of sulfuric acid, chlorine, methanol, and combinations thereof.

13. A method for mixing at least one chemical in a pipeline, the method comprising:
  providing a chemical injection and mixing system configured to a pipeline, forming a pipeline treatment system, wherein the chemical injection and mixing system comprises:
    an injection stream pipe;
    a target pipe; and
    a plurality of injection quills,
  providing a fluid flow in the pipeline treatment system;
  injecting at least one chemical via the plurality of injection quills;
  mixing the at least one injected chemical in a mixing zone of the chemical injection and mixing system, thereby mixing the at least one injected chemical in the fluid flow.

14. The method of claim 13, further comprising providing one or more chemical sources in fluid communication with the plurality of injection quills.

15. The method of claim 14, further comprising injecting at least one chemical from the one or more chemical sources.

16. The method of claim 13, wherein injecting the at least one chemical comprises injecting a chemical selected from the group consisting of sulfuric acid, chlorine, methanol, and combinations thereof.

17. The method of claim 13, wherein the injecting the at least one chemical comprises operating a control unit, thereby controlling the injection of at least one chemical with the control unit.

18. The method of claim 17, wherein operating the control unit further comprises controlling a flow rate of each of the plurality of injection quills.

19. The method of claim 18, wherein operating the control unit further comprises detecting a pH of at least one injected chemical mixed with the fluid flow downstream of the chemical injection and mixing system via a sensor.

20. The method of claim 19, wherein operating the control unit further comprises:
  transmitting a first signal comprising the detected pH to the control unit; and
  transmitting a second signal from the control unit to one or more injection quills to control a flow rate of the at least one chemical injected using the one or more injection quills.

* * * * *